US006961422B2

(12) United States Patent
Boland (10) Patent No.: US 6,961,422 B2
(45) Date of Patent: Nov. 1, 2005

(54) GAIN CONTROL METHOD FOR ACOUSTIC ECHO CANCELLATION AND SUPPRESSION

(75) Inventor: Simon Boland, Pennant Hill (AU)

(73) Assignee: Avaya Technology Corp., Basking Ridge, NJ (US)

( * ) Notice: Subject to any disclaimer, the term of this patent is extended or adjusted under 35 U.S.C. 154(b) by 504 days.

(21) Appl. No.: 10/035,617

(22) Filed: Dec. 28, 2001

(65) Prior Publication Data

US 2003/0123674 A1 Jul. 3, 2003

(51) Int. Cl.[7] ............................................... H04M 1/00
(52) U.S. Cl. ........................... 379/406.05; 379/406.06; 379/406.07; 379/406.01
(58) Field of Search .................... 379/406.01, 406.05, 379/406.06, 406.07, 406.03, 406.04, 406.08

(56) References Cited

U.S. PATENT DOCUMENTS

| | | | |
|---|---|---|---|
| 4,600,815 A | 7/1986 | Horna | |
| 5,016,271 A | 5/1991 | Ford | |
| 5,657,384 A | 8/1997 | Staudacher et al. | |
| 5,668,794 A | 9/1997 | McCaslin et al. | |
| 5,790,657 A | 8/1998 | Fujiwara | |
| 6,148,078 A | 11/2000 | Romesburg | |
| 6,185,300 B1 | 2/2001 | Romesburg | |
| 6,195,430 B1 * | 2/2001 | Eriksson et al. | 379/406.01 |
| 6,282,176 B1 | 8/2001 | Hemkumar | |
| 6,507,653 B1 * | 1/2003 | Romesburg | 379/406.05 |

OTHER PUBLICATIONS

Breining, Christina, et al., "Acoustic Echo Control, An Application of Very–High–Order Adaptive Filters," IEEE Signal Processing Magazine, Jul. 1, 1999. pp. 42–69.
Puder, Henning, et al., "Implementation of a Hands–Free Car Phone with Echo Cancellation and Noise–Dependent Loss Control," Proc. IEEE, ICASSP, 2000, vol. 6, pp. 3622–3625.

* cited by examiner

Primary Examiner—Jefferey F. Harold
(74) Attorney, Agent, or Firm—Patton Boggs LLP (57) ABSTRACT

A gain control method for reducing or eliminating the undesirable effects of acoustic echo coupling between a speaker and a microphone while providing a full-duplex connection. Weighted normalized far-end and near-end powers are used to first calculate a suppression value which is used to determine the attenuation factor between an upper and a lower limit, thus improving reliability in noisy environments. To further improve the quality of the full-duplex connection, a smoothing factor is applied to the attenuation calculation to provide a low power and constant sounding echo without annoying transient-like sounds.

6 Claims, 5 Drawing Sheets

*FIG. 1*

PRIOR ART

GAIN CONTROL METHOD FOR ACOUSTIC ECHO CANCELLATION AND SUPPRESSION

FIELD OF THE INVENTION

The invention relates to telecommunication equipment, and in particular, to a gain control method for acoustic echo cancellation and suppression.

PROBLEM

It is a problem in the field of telecommunication equipment to reduce or eliminate the unwanted effects of acoustically coupled echoes from being transmitted back to the receiving party while also providing a full duplex connection. It is also a problem in the filed of audio conferencing to prevent adding noise of the inactive talkers into the output while also providing a conference bridge where two or more conferees can talk at one.

A known conferencing technique involves monitoring the activity of all conferees and switching the digital signal of the loudest to all others. The technique is advantageous for large conferences because the idle channel noise of the inactive talkers does not get added into the output of the conference bridge. High quality conference circuits also include echo cancellers so high signal powers can be provided.

In telecommunications an echo occurs when the equipment meant to amplify the voice of the party at one end, picks up the signals from the party at the other end, and amplifies them back to that party. Some echo is acceptable in voice conversations, however, users are annoyed by listening to their own speech delayed by the round-trip time of the system. Two types of apparatus are commonly associated with reducing or eliminating acoustically coupled signals, echo suppression circuits and echo cancellers. Apparatus that performs both echo suppression and echo cancellation are also known. The differences between the known apparatus are the method by which the echo signal is reduced or eliminated.

Echo Suppression

The term echo suppression implies generally that simpler attenuation control techniques are used to reduce the level of the echo signal that is fed back. Known echo suppression devices reduce the annoying effects of echoes by turning off transmission in the reverse direction while a person is talking, thus effectively making the circuit one way, or a half-duplex connection.

Fujiwara, (U.S. Pat. No. 5,790,657) discloses an echo suppressor that uses actual averaged signal levels to calculate an attenuation factor for suppressing a signal that is acoustically coupled between a speaker and a microphone. The echo suppression apparatus comprises a reception speech detector to produce an average reception signal power level and a transmission speech detector to produce an average transmission signal level, or echo signal level. The average reception signal level, after being delayed by a time constant circuit, is compared to the average transmission signal level by a variable attenuator. If the average transmission signal level is greater than the average reception signal level, the attenuation factor is set to zero. When the attenuation factor is set to zero, meaning infinite attenuation, the result is essentially a half-duplex call. On the other hand, when the average transmission signal level is not greater than the average reception signal level, the attenuation factor is set to 1/N where N=an arbitrarily given positive real number.

The echo suppression apparatus disclosed in Fujiwara, is a simple suppression circuit that uses a simple attenuation control technique to reduce or eliminate the level of echo feedback. Thus, the echo suppression apparatus just described fails to provide an apparatus or method for echo suppression without essentially resulting in a half-duplex call.

A variable gain echo suppressor disclosed by McCaslin, (U.S. Pat. No. 5,668,794) uses normalized near-end and far-end power levels to define an associated power ratio. In McCaslin, near-end and far-end power detectors detect the near-end and far-end signal powers which are normalized. A controller that sets the operation of the attenuators uses near-end and far-end signal powers normalized to the associated background noise. An attenuation value, or factor, is determined using the ratio of the normalized near-end and far-end signal powers to locate a scaling factor from predetermined far-end and near-end tables.

While the variable gain echo suppressor disclosed in McCaslin overcomes the problem of reducing the communication to half-duplex, or one way communication, a complex double talk detector is used to block updates to the echo cancellation adaptive filter during periods of double-talk, or simultaneous near-end and far-end communication.

The double-talk detector monitors the near-end signal level to determine when near-end speech is present. When only near-end speech is present, an inhibit signal is sent to the adaptive filter, thus blocking updates to the adaptive filter. If the adaptive filter is updated during near-end speech, the adaptive filter's effectiveness would be degraded when near-end speech is not present. An advantage of the variable gain echo suppressor in McCaslin is fast convergence speed, however, after initialization, the adaptive filter has to be "trained". During the training operation the speakerphone operates in half-duplex mode.

McCaslin, uses double-talk detection to control operation of the attenuation circuit which can result in problems of clipping and/or distortion. Distortion of the voice does not occur during double-talk, however, distortion can result following periods of double-talk due to use of the actual voice activity in calculating the attenuation. The adaptive filter has to be partially re-trained after periods of double-talk.

Fujiwara and McCaslin rely on actual voice detection or double-talk detection which is not reliable in noisy environments and gives rise to clipping and/or distortion due to misclassification. The echo suppression apparatus disclosed in Fujiwara and McCaslin fail to provide a method for attenuating the acoustically coupled echo without degrading the quality of the voice transmission due to clipping and/or distortion or resulting in a half-duplex connection.

Echo Cancellation

Echo cancellation allows for the isolation and filtering of unwanted signals caused by echoes from the main transmitted signal. In general, the term echo cancellation implies that an adaptive filter is used to reduce the echo signal. An echo cancellation apparatus puts a signal on the return transmission path which is equal and opposite to the echo signal. Echo cancellation allows full duplex modems to send and receive data on the same frequency. A comprehensive summary on the prior art of adaptive filters for echo cancellation is found in C. Breining et al., "Acoustic Echo Control: An application of very-high order adaptive filters," IEEE Siganl Processing Magazine, pp. 42–69, July 1999.

Adaptation describes a filter that has a set of weights, or weighing factors. The input signal is weighted to get an output signal. Updating the weights over time allows the filter to adapt, over time, to produce an output signal that effectively cancels the acoustically coupled echo signal. Over time, the weights, or factors, of the adaptive filter do not require updating as often. This is referred to as convergence. When an adaptive filter converges, the difference between the adaptive filter output signal and the acoustically coupled signal that the output signal attenuates, is close to zero. On the other hand, when an echo canceller is initialized the adaptive filter has not converged, meaning that the difference between the output signal and the acoustically coupled signal is very large. The difference between the signals decreases over time until the adaptive filter converges. During the time required for the adaptive filter to converge, conventional echo cancellation apparatus result in half duplex operation.

The convergence speed of an adaptive filter refers to the time required for the difference between the adaptive filter output signal and the acoustically coupled signal to be almost zero. When the background noise changes or the near end receiver speaks, the signal received by the microphone changes and the adaptive filter, again, over time, adapts to the change.

Known echo cancellation techniques are usually not sufficient to attenuate the acoustically coupled echo signal because either the tail length is too short or the filter is too slow in adapting to acoustic changes. Because echo cancellation techniques require the adaptive filter to adapt to the environment for effective operation, the connection is half-duplex until the adaptive filter reaches convergence. Due to the inherent problems associated with echo cancellers, many solutions rely strongly on an additional echo suppression stage.

Combination Echo Cancellation and Suppression

An echo cancellation and suppression apparatus and method are disclosed in Puder, et al., (as found in Proceedings of the 2000 IEEE International Conference on Acoustics, Speech, and Signal Processing, Vol. 6, PP 3622–3625) which uses power difference to calculate an attenuation factor for the echo suppression stage. In Puder, et al., the apparatus is for a hands-free car phone that comprises adaptive echo cancellation, noise reduction and loss control all being supervised by a control unit. The echo canceller is an adaptive finite-impulse-response (FIR) filter using the normalized least mean square (NLMS) method for adaptation which is know to be best suited model for the loudspeaker enclosure microphone (LEM) system. Although FIR echo cancellation filters need only on the order of 10 coefficients (as found in IEEE Signal Processing Magazine, p43, July 1999), the FIR echo cancellation filter disclosed in Puder et al. uses 256 coefficients.

Generally, the echo cancellation apparatus disclosed in Puder et al. uses loss control and noise reduction in the echo suppression stage to achieve the echo attenuation of 45 dB and 30 dB. The overall echo attenuation distributed on the receiving and transmitting channels is estimated by a combination of methods to overcome the deficiencies of the individual methods. The combined estimates are used for both the step size control and to compute the additional attenuation required by the loss control. While the apparatus improves the echo cancellation by using a FIR filter with 256 coefficients to calculate an estimate for use by the loss control circuit, the echo canceller alone is not sufficient to reduce the echo signal so that it is not objectionable. Instead, Puder et al. includes a loss control circuit to add additional attenuation to further reduce the echo signal.

Using power differences, or normalized powers, reduces the unreliability of echo suppression apparatus in noisy environments and improves robustness to noise. However, the echo cancellation and suppression apparatus disclosed in Puder fails to provide an apparatus or method that does not rely on actual speech detection to calculate an attenuation factor. As previously discussed, reliance on actual speech detection can result in clipping and/or distortion.

Another known echo cancellation and suppression apparatus for use with a speakerphone is disclosed in Ford, (U.S. Pat. No. 5,016,271). Speakerphones have two basic limitations, a tendency for self-oscillation and generation of a reverberant return echo to a far-end listener. Ford, employs an adaptive echo cancellation in the receive channel to cancel the speakerphone talker echo and an adaptive echo suppressor in the transmit channel. Near-full and full-duplex operation is regularly achieved since the receive path remains open at all times and the transmit path has its gain reduced to the level necessary to suppress excessive return echo acoustically coupled from the speaker to the microphone.

While the echo canceller-suppressor disclosed in Ford, provides near-full and full-duplex operation, absolute near end and far end powers are used to calculate attenuation. An method which depends on absolute powers for attenuation gives rise to unreliability in noisy environments.

The echo suppression apparatus just described rely heavily on the suppression stage, referred to as loss control and noise reduction in Puder. As with other conventional acoustic echo cancellation and suppression circuits, the suppression stage is very important because the either the tail-length of the echo canceller is not sufficient or the adaptive filter is too slow in changing to acoustic changes. As a result the suppression stage, or loss control, does the bulk of the echo removal. Therefore, a good suppression method is critical in achieving an overall Echo Return Loss Enhancement (ERLE) of approximately 40–50 dB. If the attenuation is increased too much then the communication is effectively half-duplex. This means that the naturalness of full-duplex is sacrificed in exchange for cancelling the echo. Furthermore, artifacts such as clipping of syllables or distortion of voice can often occur due to misclassification of which part is speaking.

For these reasons, a need exists for a method for acoustic echo cancellation and suppression that combines an echo cancellation stage that does not reduce the connection to half-duplex while the adaptive filter converges and an effective echo suppression stage to attenuate the remaining echo signal without clipping the signal due to misclassification of the voice-activity.

SOLUTION

The present gain control method for acoustic echo cancellation and suppression overcomes the problems outlined above and advances the art by providing a method for calculating an attenuation factor by first calculating weighted near-end and far-end power differences and using the result to determine an attenuation factor between upper and lower limits. To further improve the quality of the full-duplex connection, a smoothing factor is used in the attenuation calculation to provide a low power and constant sounding echo without annoying transient-like sounds.

An echo cancellation stage including an adaptive filter provides a first level of attenuation and generates a filtered signal and an error signal which are used within the echo suppression stage. The received digital far-end signal is converted to analog and played at the speaker. An analog echo signal is received at the microphone and digitized at a predetermined rate of samples per second. The predetermined rate of samples per second used to digitize the analog echo signal is the same rate at which the received far-end signal is digitized. The samples are grouped in 12 blocks each having 160 samples, wherein each block overlaps the previous block by fifty-percent, thus comprising a string of 1040 samples to provide a tail length of 130 milliseconds. A tail length greater than 120 milliseconds is sufficient to remove the bulk amount of acoustic echo received in a typical office environment.

Within the echo canceller the filtered far-end signal is subtracted from the echo signal to produce an error signal which is used to update the weights of the adaptive filter. The signal strength, or power, of the far-end signal, filtered signal and echo signal are calculated in the echo suppression stage determine an attenuation factor. For each successive power calculation, a predetermined number of new samples are used for the calculation. Using the calculated signal powers, normalized far-end power is calculated as the difference between a predetermined silence power minus the far-end power and a normalized near-end power is calculated as the difference between the error power minus the filtered power. The difference between the weighted near-end and weighted far-end power a provides a suppression value that is converted to a linear value for use in calculating the attenuation factor.

The converted suppression value is smoothed using a smoothing factor to ensure a low power and constant sounding echo without annoying transient-like sounds. The final attenuation factor is determined between predetermined upper and lower limits depending on the value of the smoothed attenuation value. The transmitted signal is calculated by multiplying the error signal by the attenuation factor. Use of predetermined upper and lower limits for the attenuation factor provides attenuation even though the adaptive filter may not have reached a converged state.

Operationally, as the adaptive filter reaches a converged state, the normalized near-end power increases negatively because the error signal used to calculate the normalized near-end power decreases. Thus, the attenuation factor remains small. One the other hand, during double talk scenarios, or when only the far-end is speaking, the error signal increases. As a result the normalized near-end power decreases and may become positive, resulting in little or no attenuation. Thus, the near-end speaker is audible to the far-end party.

DETAILED DESCRIPTION

The gain control method for acoustic echo cancellation and suppression summarized above and defined by the enumerated claims may be better understood by referring to the following detailed description, which should be read in conjunction with the accompanying drawings. This detailed description of the preferred embodiment is not intended to limit the enumerated claims, but to serve as a particular example thereof. In addition, the phraseology and terminology employed herein is for the purpose of description, and not of limitation.

There are two types of echoes that may arise in telephony: electrical echoes and acoustical echoes. The acoustic echo arises in a case where there is an acoustic path between the loudspeaker and the microphone so that part of the signal reproduced by the loudspeaker is reflected, weakened, delayed, and distorted by the room, and then recorded by the microphone, which is the typical situation when using a speakerphone.

Figure 1:
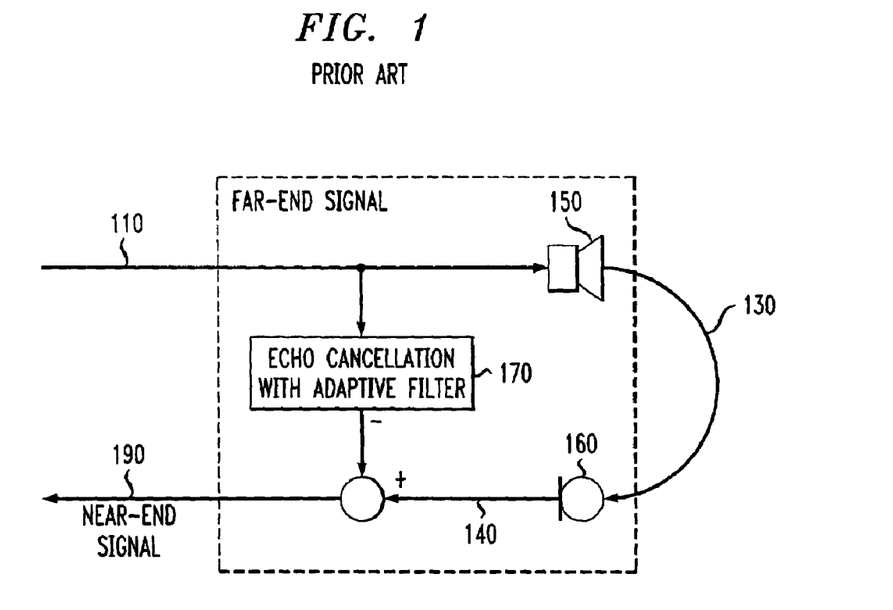
FIG. 1 illustrates a block schematic diagram of a prior art echo canceller.

Echo suppression creates a half-duplex connection—it stops noise from coming back by keeping voice traffic going in only one direction at a time. Echo cancellation offers a better solution by using adaptive filters to cancel, or at least, significantly weaken the echoes, thus improving the quality and performance of the telephone connections. Referring to FIG. 1, an echo canceller serves to cancel an echo resulting from acoustic coupling between the speaker 150 and microphone 160. Acoustic coupling is a phenomenon that a portion the received far-end signal 110 played from speaker 150 is supplied to microphone 160 through an acoustic signal path 130. Echo canceller 170 generates an estimated echo signal that is combined with the actual echo signal 140 to reduce the echo reflected back to the far-end to an acceptable level.

With echo cancellation, digital transmission is allowed to proceed in both directions within the same bandwidth simultaneously. An estimate, or prediction, of the echo signal is generated at the near-end by an adaptive filter within echo canceller 170 and is subtracted from the received far-end signal 110. This effectively cancels the echo. Because the received far-end signal 110 is known, the echo canceller 170 can, over time, predict the echo characteristics and produce an approximation of echo signal 140. In echo cancellation, complex methodic procedures are used to compute the approximation predicting the characteristics of the acoustic echo. The format of this echo prediction must be learned by the echo canceller in a process known as adaptation. When initialized, an echo prediction is not available, thus, during this learning process, the echo canceller effectively allows communication in only one direction, or half duplex. It might be said that the parameters learned from the adaptation process generate the prediction of the echo signal, which then forms an audio picture of the room in which the microphone is located. During a conversation the audio picture constantly alters, and in turn, the canceller must adapt continuously. Adaptive filters are used to cancel, or at least, significantly weaken the echoes for improving the quality and performance of telephone connections.

Figure 2:
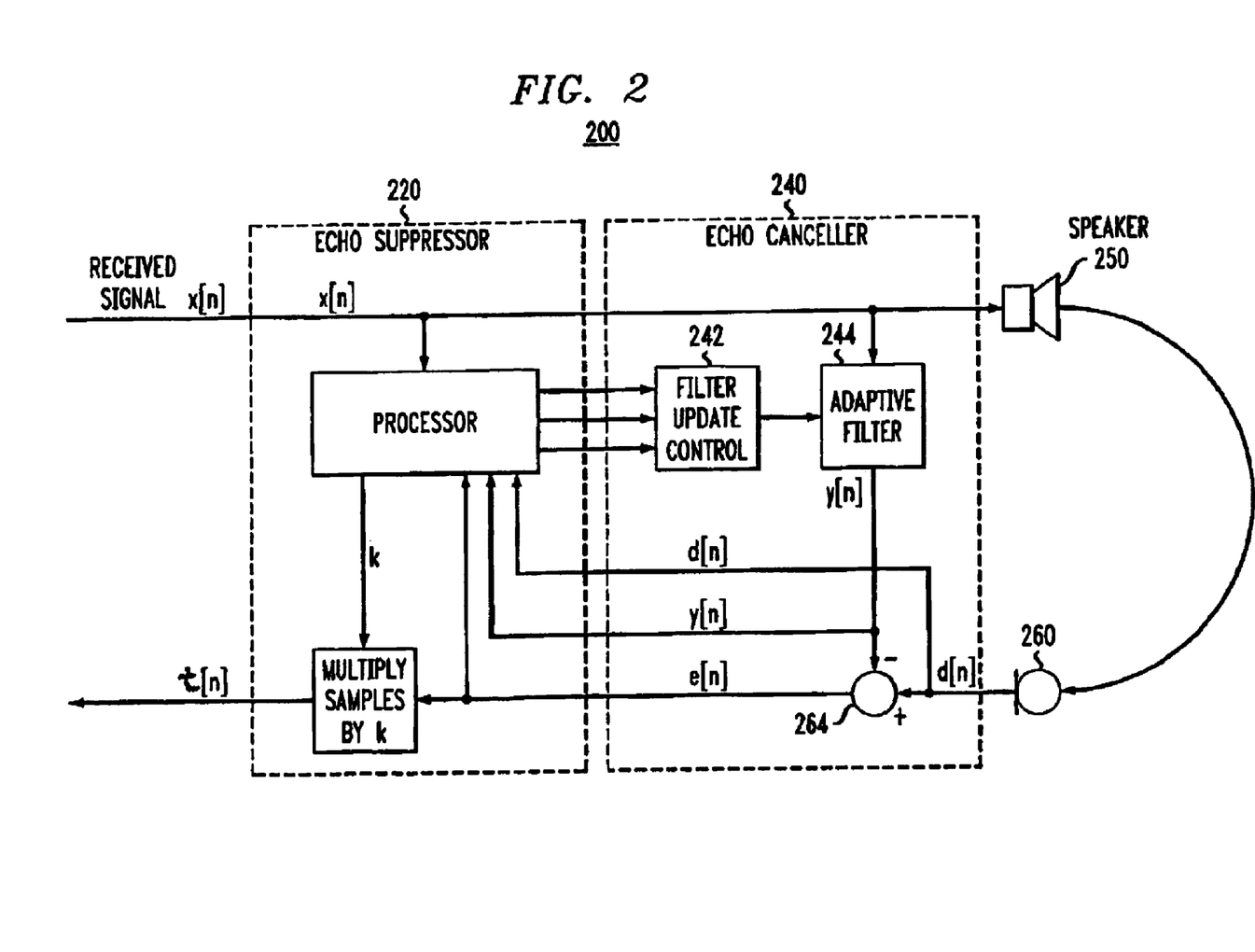
FIG. 2 illustrates a block schematic diagram of the present acoustic echo cancellation and suppression apparatus.

Echo Cancellation Stage—FIG. 2:

Referring to FIG. 2, a far-end signal x[n] is received by the near-end device 200, converted to an analog signal (not shown) and played to the recipient through speaker 250. A portion of the far-end signal x[n] is acoustically coupled into the near-end microphone 260. The acoustically coupled echo signal d[n] is fed back into the echo canceller 240. Within echo canceller 240, the far-end signal x[n] is also fed into an adaptive filter 244 which generates a filtered signal y[n]. Any form of adaptive digital filter could be used here, for the purpose of illustration and discussion, a multi-block frequency-domain (MDF) least-mean square approach is selected to meet the complexity of the present gain control method for acoustic echo cancellation and suppression.

The MDF adaptive filter is most suitable for real time applications implemented in digital signal processing hardware. In performance, the MDF adaptive filter introduces smaller block delay, is faster and therefore suitable for telecommunications. Improved performance using the MDF adaptive filter is accomplished by using smaller block size, updating the weight factor more often, and reducing the total execution time of the adaptive process. See Soo et al., "Multidelay Block Frequency Domain Adaptive Filter," IEEE Transactions on Acoustics, Speech and Signal Processing, pp. 373–376, February 1990.

The analog echo signal received at the microphone is digitized and sampled (not shown) at the same rate of samples per second as the received digital far-end signal. For purpose of illustration, the present gain control method for echo cancellation and suppression is described using samples digitized at a rate of 8000 samples per second although other sampling rates could be substituted. The filtered signal y[n] from adaptive filter 244 is subtracted from echo signal d[n] to produce an error signal e[n]. Subtracting the filtered signal y[n] from the echo signal d[n] in the echo cancellation stage 240 provides a first level of attenuation, producing error signal e[n]. The error signal e[n] is further attenuated in the echo suppression stage 220 before transmit signal t[n] is transmitted to the far-end device.

Figure 3:
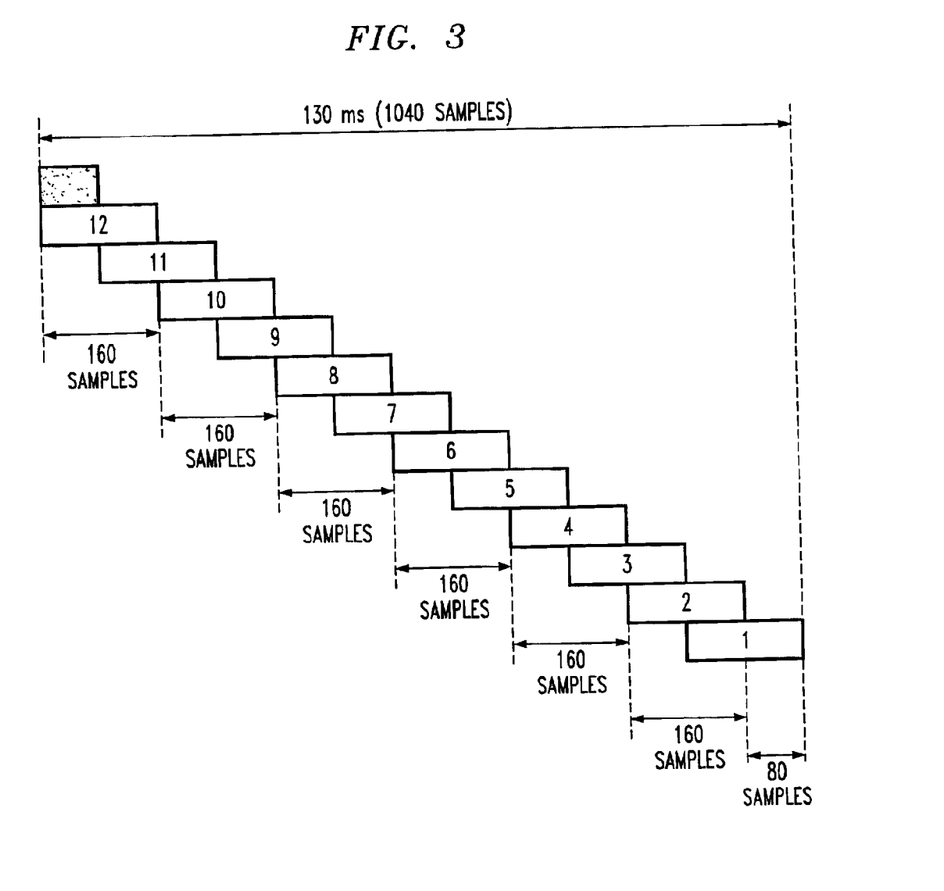
FIG. 3 illustrates a 130 millisecond tail length of 1040 digital signal samples that is used within the gain control method for acoustic echo cancellation and suppression.
Figure 4:
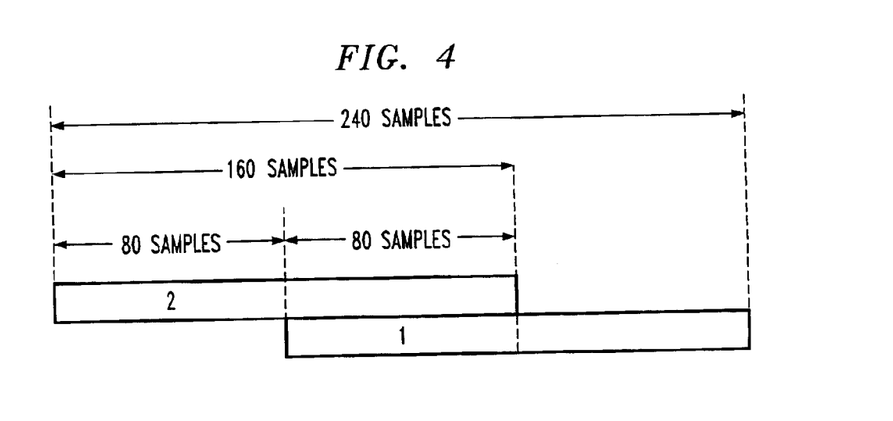
FIG. 4 illustrates an expanded view of two blocks of samples from FIG. 3.

The filter update control 242 within echo canceller 240 uses error signal e[n] to update the weights of adaptive filter 244. This uses twelve blocks wherein each successive block overlaps the previous block by fifty-percent as illustrated in FIG. 3. For example, referring to FIG. 4, the first 160 samples are in block 1. The last 80 samples in block 1 are also used for the first 80 samples of block 2 so that the combined blocks 1 and 2 comprise a total of 240 samples, of which 80 samples are duplicated. Referring back to FIG. 3, this provides a tail length, from the first sample in block 1 to the last sample in block 12, of 1040-16 bit samples, which translates to a 130 milliseconds tail length.

While the tail length is discussed and illustrated for 1040, 16 bit samples other tail lengths can be substituted. A tail length of 130 milliseconds was selected because a tail length greater than or equal to 120 milliseconds was found to remove the bulk amount of acoustic echo received in a typical office environment. Changing the environment in which a voice terminal incorporating the present gain control method for acoustic echo cancellation and suppression is operated, may require the tail length to be adjusted accordingly.

Figure 5:
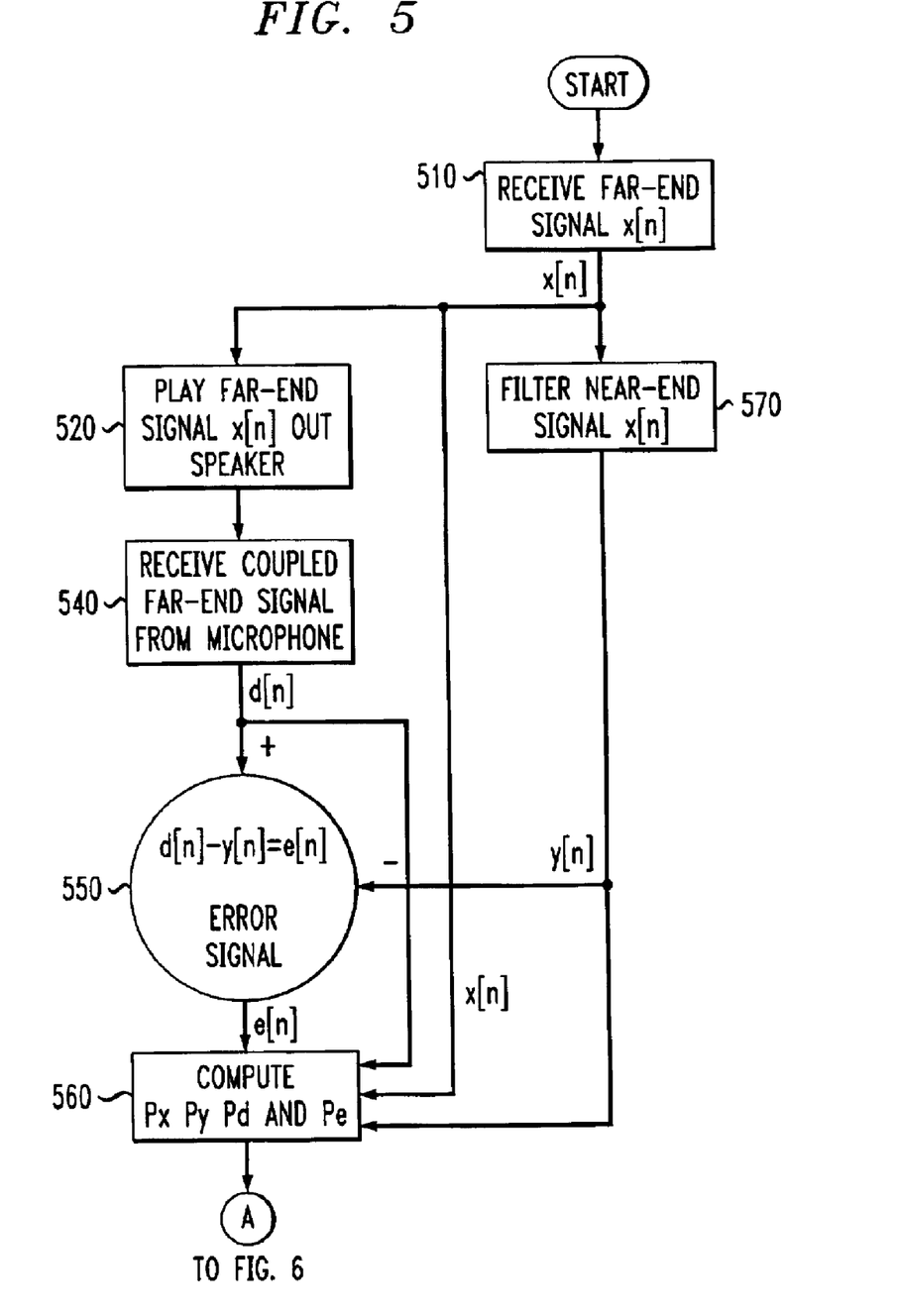
FIG. 5 illustrates a block diagram of the method of calculating far-end signal variations within the present gain control method for acoustic echo cancellation and suppression apparatus.
Figure 6:
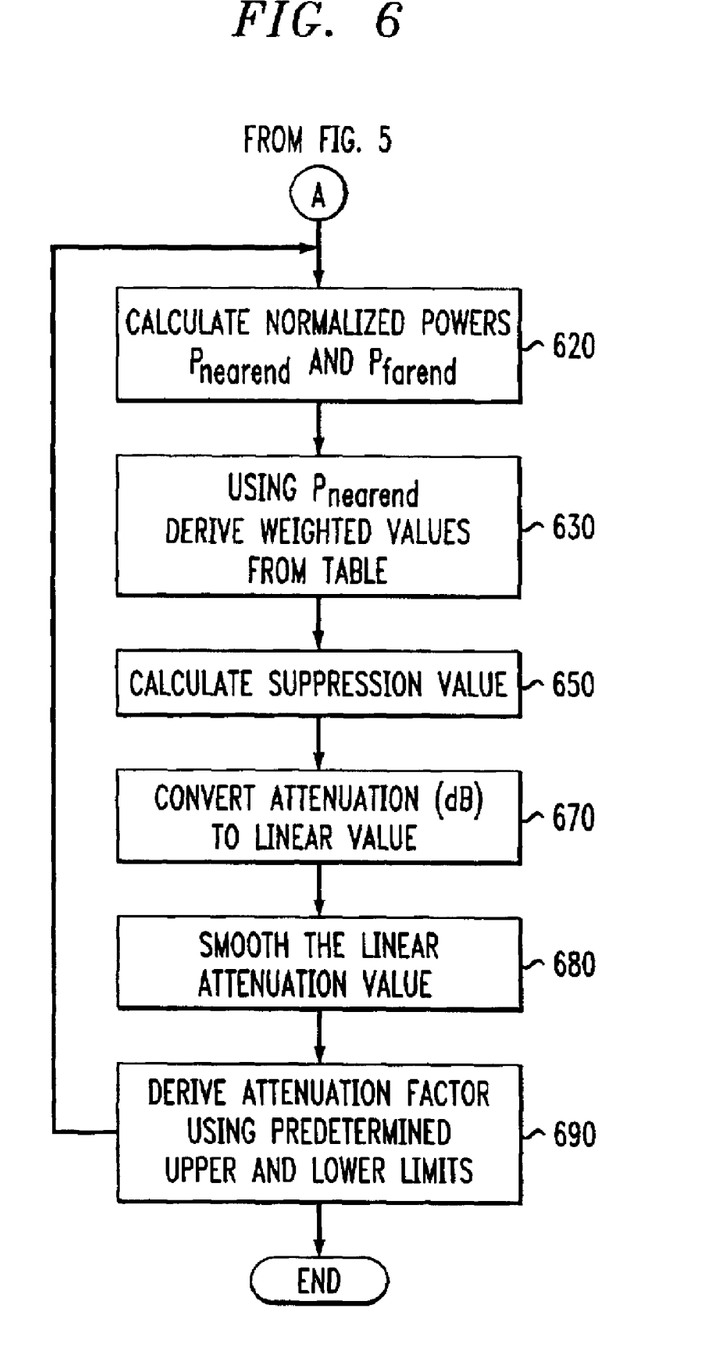
FIG. 6 illustrates a block diagram of the method of calculating an attenuation factor within the present gain control method for acoustic echo cancellation and suppression apparatus.

Echo Suppression—FIGS. 2, 5 and 6:

The echo suppression stage of the present gain control method for acoustic echo cancellation and suppression is necessary to further reduce the echo signal to a level that is not objectionable. The echo suppressor adds additional attenuation because the echo cancellation stage does not sufficiently attenuate the echo signal. The amount of attenuation added by the echo suppression stage is dependent of the echo cancellation stage since the echo cancellation variables x[n], y[n], and e[n] are all used to calculate the attenuation factor k used to attenuate error signal e[n] to produce transmit signal t[n].

Referring to FIG. 2 in conjunction with FIG. 5, far-end signal x[n] is received in block 510 and is filtered by adaptive filter 244 in block 570 to produce filtered signal y[n]. After converting the far-end signal to analog, far-end signal x[n] is played from speaker 250 in block 520. Echo signal d[n] is received at microphone 260 in block 540 and digitized as previously discussed. Filtered signal y[n] is subtracted from the echo signal d[n] in block 550 to produce error signal e[n]. The power of the signals are calculated every 80 samples in block 560. The power, $P_x$, of the far-end signal x[n] is computed according to $$P_x = 10\log_{10}\left[1/N \sum_{n=0}^{n=N-1} [x[n]]^2\right]$$

summing from n=0 to n=N−1, where n=0, 1, 2 . . . , N−1 and N=80. Substituting y[n], d[n], and e[n] for x[n], produces $P_y$, $P_d$, and $P_e$ respectively. The power calculations are used to control the adaptation speed of adaptive filter 244 and for calculating an attenuation factor for echo suppression stage 220. In this example, every 10 milliseconds the signal power is recalculated using a new string of 80 samples.

Referring to FIG. 6, within echo suppressor 220, $P_x$, $P_y$, and $P_e$ are used to calculate a normalized far-end and near-end power, $P_{near-end}$ and $P_{far-end}$ respectively in block 620. The normalized far-end power, $P_{far-end}$, is calculated as the difference between the predetermined silence power, $P_s$, minus the calculated far-end power level according to $P_{far-end}=P_s-P_x$. For purpose of illustration, the far-end silence power is selected as 40 dB for calculating $P_{far-end}$ although other positive values greater than 0 dB and less than 60 dB can be substituted. The normalized near-end power is calculated as the difference between the error power and the filtered power according to the formula $P_{near-end}=P_e-P_y$. Using normalized, or relative, values for the near-end and far-end power calculations improves robustness to noise using the present gain control method for acoustic echo cancellation and suppression.

Next a suppression value, A, is calculated in block 650 by summing the product of the normalized far-end power multiplied by a first weighted factor, $W_1$, plus the product of the normalized near-end power multiplied by a second weighted factor, $W_2$ to produce a suppression value in decibels. The formula for the calculation is $A=W_1P_{far-end}+W_2P_{near-end}$ where predetermined values for $W_1$ and $W_2$ are derived in block 630 based on the value of $P_{near-end}$ according to:

| | | |
|---|---|---|
| $P_{near\ end} < C_1$ | $W_1 = 1.00$ | $W_2 = 0.50$ |
| $C_1 \leq P_{near\ end} < C_2$ | $W_1 = 0.50$ | $W_2 = 0.25$ |
| $P_{near\ end} \geq C_2$ | $W_1 = 0.00$ | $W_2 = 0.50$ |

The weighted values, $W_1$ and $W_2$, are used to compute a weighted difference between the normalized far-end power and the normalized near-end power to compute a suppression value, A, in block 650.

Unlike prior art echo suppressors, the present gain control method for acoustic echo cancellation and suppression uses normalized power difference instead of actual power differences. Use of actual powers in calculating attenuation gives rise to unreliability in noisy environments. Using normalized, or relative, powers such as the difference used to calculate the far-end and the near-end power values improves robustness to noise.

Using the present gain control method for acoustic echo cancellation and suppression, when far-end speech is present and near-end speech is not, $P_x$ is greater than $P_y$, $P_d$ and $P_e$. Therefore, the normalized $P_{far-end}$ is large. When convergence is reached, $P_{near-end}$ increases negatively because the power level of the filtered received signal $P_y$ increases while the power level of the echo signal $P_d$ remains relatively constant, therefore causing the power level of error signal $P_e$ to go negative. Thus, $A=(1.0)(P_{far-end})+(0.5)(-P_{near-end})$, resulting in a small suppression value A. The smaller the suppression value A, the greater the attenuation within the echo suppressor stage.

Conversely, when near-end speech is present and far-end speech is not, the signal power level of the filtered received signal $P_y$ is low and the power level of the error signal is high, resulting in normalized near end power level $P_{near-end}$ that is large. Thus $A=(0.0)(P_{far-end})+(0.5)(-P_{near-end})$, resulting in a large suppression value A. As the value of suppression value A increases, the attenuation within the echo suppressor decreases.

Referring back to FIG. 6, the suppression value, A, calculated in block 650 is converted from decibels to a linear value by the equation $k=10^{A/20}$ in block 670. To insure a low-power and constant sounding echo without any annoying transient-like sounds, the linear value is smoothed using a predetermined smoothing factor. For purpose of illustration and discussion, a smoothing factor of $\lambda=0.85$ is selected although other smoothing factors less than 0.9 and greater than or equal to 0.5 could be substituted. The linear attenuation value from the echo cancellation stage is smoothed in block 680 using the formula $k_{smooth}=\lambda k_{linear}+(1-\lambda) K_{linear}$.

Within the echo suppression stage the attenuation factor k is calculated to be a value between 0 and 1. In the prior art echo cancellation and suppression circuitry, an attenuation factor of k=1 resulted in no attenuation of the signal while an attenuation factor k=0 resulted in infinite attenuation. Infinite attenuation is analogous to a half-duplex connection. The present gain control method for acoustic echo cancellation and suppression calculates an attenuation factor with an upper limit of $k_{max}=1$ and a lower limit of $k_{min}=0.1$, thus eliminating the result of a half-duplex call. Placing a lower limit of $k_{min}=0.1$ on attenuation factor k is equivalent to 20 decibels of attenuation while maintaining a fill-duplex connection. While $k_{min}=0.1$ is discussed and illustrated as the lower limit, alternative positive values greater that 0 and less than 1 can be substituted.

Using the smoothed linear attenuation value $k_{smooth}$ from block 680, the attenuation factor is determined in block 690 using the previously discussed upper and lower limits of $k_{min}=0.1$ and $k_{max}=1.0$. If the smoothed suppression factor $k_{smooth}$ is between the upper and the lower limit, the smoothed suppression factor is used. Where $k_{smooth}$ is greater than the upper limit, the upper limit of 1.0 is selected and when $k_{smooth}$ is less than the lower limit, the lower limit is selected.

The present gain control method for acoustic echo cancellation and suppression does not use explicit voice-activity detection of either the far-end or the near-end. Neither is double-talk detection used. Thus, the chance of clipping due to misclassification of the voice-activity or double talk detection is minimized. The only way that clipping could occur is by setting the value of $k_{min}$ too low. Setting $k_{min}=0.1$ is an optimal value for suppressing the echo signal while still providing a natural full-duplex connection in a typical office environment.

Referring to FIGS. 2 and 6, calculations in blocks 620, 630, 650, 670, 680 and 690 are computed to produce an attenuation factor k that is multiplied by error signal e[n] to produce a transmit signal t[n] that is sent to the far-end voice terminal. Using the present gain control method for echo cancellation and suppression, when far-end speech is present and near-end speech is not, $P_x$ is greater than $P_y$, $P_d$ and $P_e$. Therefore, the normalized $P_{far-end}$ is large. Unlike prior art echo suppressors, this ensures attenuation even though the adaptive filter may not have reached convergence. Prior art echo suppressors typically operate as a half duplex connection until the adaptive filter reaches convergence. When convergence is reached, $P_{near-end}$ increases negatively because the power level of the filtered signal $P_y$ increases while the power level of the echo signal $P_d$ remains relatively constant, therefore decreasing the power level of error signal $P_e$. Subsequently, the attenuation factor k remains small.

As to alternative embodiments, those skilled in the art will appreciate that the values used to calculate the attention factor A in the present gain control method for acoustic echo cancellation and suppression description may be adjusted for operation in different environments. While the present gain control method for acoustic echo cancellation and suppression has been illustrated and described utilizing a particular adaptive filter, it is for illustration purpose only. Other forms of adaptive filtering, such as time-domain Normalized Least Mean Square (NLMS) or recursive Least Squares (RLS), could be used.

It is apparent that there has been described, a gain control method for acoustic echo cancellation and suppression, that fully satisfies the objects, aims, and advantages set forth above. While the gain control method for acoustic echo cancellation and suppression has been described in conjunction with specific embodiments thereof, it is evident that many alternatives, modifications, and/or variations can be devised by those skilled in the art in light of the foregoing description. Accordingly, this description is intended to embrace all such alternatives, modifications and variations as fall within the spirit and scope of the appended claims.

What is claimed is:

1. A gain control method for acoustic echo cancellation and suppression for use with a full duplex voice terminal receiving a far-end signal from a far-end voice terminal and sending a transmit signal to the far-end voice terminal, the full duplex voice terminal having an adaptive filter, a speaker and a microphone, the method comprising:

playing the far-end signal at the speaker;

receiving an echo signal that is acoustically coupled from the speaker to the microphone, wherein the echo signal is a portion of the far-end signal played at the speaker;

filtering the far-end signal by the adaptive filter to generate a filtered signal;

calculating an error signal, wherein the error signal is the difference between the echo signal minus the filtered signal;

calculating an attenuation factor, comprising:

calculating a suppression value from the far-end signal, the filtered signal, the error signal and a predetermined value, smoothing the suppression value to produce a smoothed suppression value; and deriving the attenuation factor from the smoothed suppression value, wherein the attenuation factor is between the predetermined upper limit and the predetermined lower limit, converting the suppression value to a linear value, applying a predetermined smoothing factor to the linear value to produce a smoothed linear value, determining the attenuation factor between the predetermined upper limit and the predetermined lower limit, wherein when the smoothed linear value is less than the predetermined lower limit the attenuation factor is equal to the predetermined lower limit and when the smoothed linear value is greater than the predetermined upper limit the attenuation factor is equal to the predetermined upper limit and when the smoothed linear value is between the predetermined upper limit and the predetermined lower limit, the attenuation factor is equal to the smoothed linear value; and calculating the transmit signal, wherein the transmit signal is the product of the attenuation factor times the error signal.

2. The gain control method of claim 1 wherein receiving an echo signal comprises:

receiving an analog echo signal from the microphone; and digitizing the analog echo signal at a predetermined rate of samples per second, wherein the rate of samples for second is the same rate of samples per second as the received far-end signal.

3. A gain control method for acoustic echo cancellation and suppression for use with a full duplex voice terminal receiving a far-end signal from a far-end voice terminal and sending a transmit signal to the far-end voice terminal, the full duplex voice terminal having an adaptive filter, a speaker and a microphone, the method comprising:

playing the far-end signal at the speaker;

receiving an echo signal that is acoustically coupled from the speaker to the microphone wherein the echo signal is a portion of the far-end signal played at the sneaker;

filtering the far-end signal by the adaptive filter to generate a filtered signal;

calculating an error signal, wherein the error signal is the difference between the echo signal minus the filtered signal;

calculating an attenuation factor, comprising:

calculating a suppression value from the far-end signal, the filtered signal, the error signal and a predetermined silence value, smoothing the suppression value to produce a smoothed suppression value, deriving the attenuation factor from the smoothed suppression value, wherein the attenuation factor is between the predetermined upper limit and the predetermined lower limit calculating a far-end power from the far-end signal, calculating a normalized far-end power as the difference between the predetermined silence power minus the far-end power, calculating an error power from the error signal, calculating a filtered power from the filtered signal, calculating a normalized near-end power as the difference between the error power minus the filtered power, locating a first weighted value and a second weighted value from a table of two or more predetermined first weighted values and two or more predetermined second weighted values, wherein the normalized near-end power points to the corresponding first weighted value and the corresponding second weighted, calculating the suppression value as the sum of the product of the first weighted value times the normalized far-end power plus the product of the second weighted value times the normalized near-end power; and calculating the transmit signal, wherein the transmit signal is the product of the attenuation factor times the error signal.

4. A method of calculating an attenuation factor for use with a full duplex voice terminal comprising an echo canceller having an adaptive filter to filter a far-end signal and produce a filtered signal, and an echo suppressor comprising a processor, a speaker and a microphone that receives an acoustically coupled echo signal, the method comprising:

subtracting the filtered signal from the acoustically coupled echo signal to produce an error signal;

processing the far-end signal, the filtered signal, and the error signal to compute a far-end power, a filtered power, and an error power respectively;

calculating a suppression value, comprising:

calculating a normalized near-end power as the error power minus the filtered power, calculating a normalized far-end power as the predetermined silence power minus the far-end power, using the normalized near-end power to locate a first weighted value from two or more first weighted values and a second weighted value from two or more second weighted values, calculating the suppression value as the sum of the product of the first weighted value times the normalized far-end power plus the product of the second weighted value times the normalized near-end power;

converting the suppression value to a linear value; and determining the attenuation factor between an upper limit and a lower limit, wherein the attenuation factor is the upper limit when the linear value is greater than the upper limit, is the lower limit when the linear value is less than the lower limit and is the linear value when the linear value is between the upper limit and the lower limit.

5. The method of claim 4 further comprising:

applying a predetermined smoothing factor to the linear value to produce a smoothed linear value, wherein the smoothed linear value is used to determine the attenuation factor.

6. A gain control method for acoustic echo cancellation and suppression for use with a full duplex voice terminal having a speaker and a microphone, wherein the full duplex voice terminal receives a far-end signal x[n] from a far-end voice terminal and sends a transmit signal t[n] to the far-end voice terminal, the method comprising:

filtering the far-end signal x[n] to produce a filtered signal y[n];

receiving an analog echo signal from the microphone;

digitizing the analog echo signal at a predetermined rate of samples per second to produce an echo signal d[n];

calculating an error signal e[n] according to e[n]=d[n]−y[n];

processing the far-end signal x[n], the filtered signal y[n], the echo signal d[n] and the error signal e[n] to calculate respective far-end power $P_x$, filtered power $P_y$, echo power $P_d$, and error power $P_e$;

calculating a normalized far-end power $P_{far-end}$ according to $P_{far-end}=P_a-P_x$ where $P_a$ is a predetermined silence power;

calculating a normalized near-end power $P_{near-end}$ according to $P_{near-end}=P_e-P_y$;

locating a first weight $W_1$ and a second weight $W_2$ from a table having two or more first weights $W_1$ and two or more corresponding second weights $W_2$, wherein the one of the two or more first weights $W_1$ and the one of the two or more second weights $W_2$ is pointed to by $P_{near-far}$;

calculating a suppression value A according to $A=W_1P_{far-end}+W_2P_{near-end}$;

converting the suppression value A to a linear suppression value $k_{inst}$;

applying a predetermined smoothing factor to the linear suppression value $k_{inst}$ to produce a smoothed linear suppression value $k_{smooth}$;

determining an attenuation factor k between an upper limit and a lower limit; wherein when the smoothed linear suppression value is less than the lower limit the attenuation factor is equal to the lower limit and when the smoothed linear suppression value is greater than the upper limit the attenuation factor is equal to the upper limit and when the smoothed linear suppression value is between the upper limit and the lower limit the attenuation factor is equal to the smoothed linear suppression value; and calculating the transmit signal t[n] according to t[n]=e[n] k.

* * * * *